United States Patent
Hagi et al.

(10) Patent No.: US 10,609,061 B2
(45) Date of Patent: *Mar. 31, 2020

(54) ANOMALY DETECTION USING COGNITIVE COMPUTING

(71) Applicant: International Business Machines Corporation, Armonk, NY (US)

(72) Inventors: Sharon Hagi, Thornhill (CA); Gary I. Givental, Bloomfield Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,901

(22) Filed: Apr. 29, 2019

(65) Prior Publication Data

US 2019/0260789 A1    Aug. 22, 2019

Related U.S. Application Data

(63) Continuation of application No. 15/810,367, filed on Nov. 13, 2017.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC .. H04L 63/1425; H04L 63/1416; G06N 20/00
(Continued)

(56) References Cited

U.S. PATENT DOCUMENTS

| 5,805,801 A | * | 9/1998 | Holloway | ........... H04L 63/0218 |
| | | | | 726/22 |
| 5,905,859 A | * | 5/1999 | Holloway | ............... H04L 29/06 |
| | | | | 726/22 |

(Continued)

FOREIGN PATENT DOCUMENTS

| CN | 104348829 A | 2/2015 |
| EP | 2369529 A1 | 9/2011 |

OTHER PUBLICATIONS

"The Science of Anomaly Detection: How HTM Enables Anomaly Detection in Streaming Data", Numenta, White Paper, Copyright © 2015 Numenta, Inc., 19 pages.

(Continued)

*Primary Examiner* — Michael S McNally
(74) *Attorney, Agent, or Firm* — Stosch Sabo

(57) ABSTRACT

An anomaly detection system configured to generate a plurality of tensors based on spatial attributes of a set of cybersecurity data and temporal attributes of the set of cybersecurity data. The set of cybersecurity data comprising numeric data and textual data collected from a plurality of computational sources. The anomaly detection system can provide the plurality of tensors to a Hierarchical Temporal Memory (HTM) network. The HTM network can be configured to generate respective HTM outputs for respective regions of the HTM network. The anomaly detection system can determine that at least one HTM output indicates an anomaly, convert the at least one HTM output to a notification, and provide the notification to a user interface.

20 Claims, 9 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2002/0184190 | A1* | 12/2002 | Sugiura | H04L 63/145 |
| 2004/0030778 | A1* | 2/2004 | Kronenberg | H04L 41/069 709/224 |
| 2006/0195896 | A1 | 8/2006 | Fulp et al. | |
| 2006/0282660 | A1 | 12/2006 | Varghese et al. | |
| 2008/0208966 | A1* | 8/2008 | Edwards | H04L 51/12 709/203 |
| 2014/0067734 | A1 | 3/2014 | Hawkins et al. | |
| 2017/0076217 | A1 | 3/2017 | Krumm et al. | |

OTHER PUBLICATIONS

"Rogue Behavior Detection: Identifying Behavioral Anomalies in Human Generated Data", Numenta, White Paper, Copyright © 2014 Numenta, Inc., 11 pages.

Sabnani, "Computer Security: A Machine Learning Approach", Technical Report, RHUL-MA-2008-09, Department of Mathematics, Royal Holloway, University of London, Jan. 7, 2008, 62 pages.

Tavallaee et al., "Toward Credible Evaluation of Anomaly-Based Intrusion-Detection Methods", IEEE Transactions on Systems, Man, and Cybernetics—Part C: Applications and Reviews, revised Dec. 16, 2009, Copyright 2010 IEEE, 9 pages.

Chandola et al., "Anomaly Detection: A Survey", ACM Comput. Surv. 41, 3, Article 15 (Jul. 2009), 58 pages. DOI = 10.1145/1541880.1541882, http://doi.acm.org/10.1145/1541880.1541882.

Keogh et al., "HOT SAX: Efficiently Finding the Most Unusual Time Series Subsequence", The 5th IEEE International Conference on Data Mining, 2005, Copyright 2005 IEEE, 8 pages.

Laptev et al., "Yahoo Labs News: Announcing a Benchmark Dataset for Time Series Anomaly Detection", Yahoo, Mar. 25, 2015, 3 pages. https://research.yahoo.com/news/announcing-benchmark-dataset-time-series-anomaly-detection.

Hawkins, "Hierarchical Temporal Memory including HTM Cortical Learning Algorithms", Numenta, Version 0.2.1, Sep. 12, 2011, © Numenta, Inc. 2011, 68 pages.

Numenta, "Leading the New Era of Machine Intelligence", printed Nov. 8, 2017, 2 pages. https://numenta.com/#applications.

"Numenta Platform for Intelligent Computing", NuPIC, Numenta, 3 pages. printed on Nov. 8, 2017. https://github.com/numenta/nupic.

Purdy, "Science of Anomaly Detection", Numenta, Oct. 17, 2014, Online Video, 2 pages. http://numenta.com.s3-website-us-west-2.amazonaws.com/papers-videos-and-more/resources/science-of-anomaly-detection/.

Hawkins, "The Science of Anomaly Detection", Numenta, Mar. 2014, Blog, 3 pages. https://numenta.com/blog/2014/03/20/science-of-anomaly-detection/.

"How Grok Works", Grok, Avik Partners, LLC—2017, printed Nov. 9, 2017, 4 pages. http://grokstream.com/how-grok-works/.

Rosner, "Percentage Points for a Generalized ESD Many-Outlier Procedure", Published by: Taylor & Francis, Ltd. on behalf of American Statistical Association and American Society for Quality, vol. 25, No. 2 (May 1983), pp. 165-172, Abstract Only, 4 pages.

Hawkins et al., "On Intelligence: How a New Understanding of the Brain Will Lead to the Creation of Truly Intelligent Machines", Publisher: Times Books, 2004, 174 pages.

Dua et al., "Data Mining and Machine Learning in Cybersecurity", CRC Press, Taylor & Francis Group, An Auerbach Book, © 2011 by Taylor and Francis Group, LLC, pp. 11-12.

Ye et al., "An Anomaly Detection Technique Based on a CHI-Square Statistic for Detecting Intrusions Into Information Systems", Quality and Reliability Engineering International, 2001, 8 pages, Copyright 2001 John Wiley & Sons, Ltd.

Feinstein et al., "Statistical Approaches to DDoS Attack Detection and Response", Proceedings of the DARPA Information Survivability Conference and Exposition (DISCEX'03), Copyright 2003 IEEE, 12 pages.

Smaha, "Haystack: An Intrusion Detection System", Copyright 1988 IEEE, Tracor Applied Sciences, Inc. 8 pages.

Ye et al., "Multivariate Statistical Analysis of Audit Trails for Host-Based Intrusion Detection", IEEE Transactions on Computers, vol. 51, No. 7, Jul. 2002, 11 pages.

Yamanishi et al., "Data Mining for Security", Falsification Prevention and Protection Technologies and Products, Special Issue on Security for Network Society, NEC Journal of Advanced Technology, vol. 2, No. 1, Winter 2005, 7 pages.

Yamanishi et al., "On-line Unsupervised Outlier Detection Using Finite Mixtures with Discounting Learning Algorithms", The Sixth ACM SIGKDD International Conference on Knowledge Discovery and Data Mining, Aug. 2000, Boston, MA, 31 pages.

Chan et al., "A Machine Learning Approach to Anomaly Detection", Technical Report CS-2003-06, Mar. 2003, Department of Computer Sciences, Florida Institute of Technology, 13 pages.

Mahoney et al., "Learning Rules for Anomaly Detection of Hostile Network Traffic", Department of Computer Sciences, Florida Institute of Technology, 2003, 11 pages.

Soule et al., "Combining Filtering and Statistical Methods for Anomaly Detection", Internet Measurement Conference 2005, USENIX Association, 14 pages.

Portnoy et al., "Intrusion Detection with Unlabeled Data Using Clustering", Department of Computer Science, Columbia University, 2001, 14 pages.

Leung et al., "Unsupervised Anomaly Detection in Network Intrusion Detection Using Clusters", Department of Computer Science and Software Engineering, The University of Melbourne, Copyright 2005, Australian Computer Society, Inc., 10 pages.

Warrender, "Detecting Intrusions Using System Calls: Alternative Data Models", Dept. of Computer Science, University of New Mexico, Copyright 1999 IEEE, 13 pages.

Zhang et al., "Anomaly Based Network Intrusion Detection with Unsupervised Outlier Detection", IEEE ICC 2006, 6 pages.

Li et al., "Detection and Identification of Network Anomalies Using Sketch Subspaces", IMC'06, Oct. 25-27, 2006, Rio de Janeiro, Brazil, Copyright 2006 ACM, 6 pages.

Lakhina et al., "Mining Anomalies Using Traffic Feature Distributions", Department of Computer Science, Boston University, Aug. 2005, 30 pages.

Lee et al., "Data Mining Approaches for Intrusion Detection", 7th USENIX Security Symposium, San Antonio, Texas, Jan. 26-29, 1998, 16 pages, Columbia University.

Abraham et al., "D-SCIDS: Distributed soft computing intrusion detection system", accepted Jun. 8, 2005, Copyright 2005 Elsevier Ltd., doi:10.1016/j.jnca.2005.06.001, 19 pages.

Lee et al., "A Data Mining Framework for Building Intrusion Detection Models", Computer Science Department, Columbia University, May 1999, 13 pages, DOI: 10.1109/SECPRI.1999.766909.

Ghosh et al., "A Study in Using Neural Networks for Anomaly and Misuse Detection", Proceedings of the 8th USENIX Security Symposium, Washington, D.C., USA, Aug. 23-26, 1999, 11 pages.

Liu et al., "Isolation-based Anomaly Detection", ACM Transactions on Knowledge Discovery from Data, Mar. 2012, 44 pages.

Lakhina et al., "Diagnosing Network-Wide Traffic Anomalies", SIGCOMM'04, Aug. 30-Sep. 3, 2004, Portland, Oregon, Copyright 2004 ACM, 12 pages.

Ringberg et al., "Sensitivity of PCA for Traffic Anomaly Detection", SIGMETRICS'07, Jun. 12-16, 2007, San Diego, California, Copyright 2007 ACM, 12 pages.

Liao et al., "Use of K-Nearest Neighbor classifier for intrusion detection", Proceedings of the 11th USENIX Security Symposium, San Francisco, CA, Aug. 2002, 10 pages.

Hu et al., "Robust Support Vector Machines for Anomaly Detection in Computer Security", Published 2003 in ICMLA, 7 pages.

Chen et al., "Using Rough Set and Support Vector Machine for Network Intrusion Detection", International Journal of Network Security & Its Applications (IJSNA),vol. 1, No. 1, Apr. 2009, 13 pages.

(56) References Cited

OTHER PUBLICATIONS

Cannady, "Artificial Neural Networks for Misuse Detection", National Information Systems Security Conference, 1998, 14 pages.

Mukkamala et al., "Feature Selection for Intrusion Detection using Neural Networks and Support Vector Machines", Department of Computer Science, Institute for Complex Additive Systems Analysis, 2003, 17 pages, https://doi.org/10.3141/1822-05.

Srinivasa, "Application of Genetic Algorithms for Detecting Anomaly in Network Intrusion Detection Systems", CCSIT 2012, Part I, LNICST 84, pp. 582-591, 2012, © Institute for Computer Sciences, Social Informatics and Telecommunications Engineering 2012.

Chebrolu et al., "Feature deduction and ensemble design of intrusion detection systems", Computers & Security (2005), revised Jul. 28, 2004; accepted Sep. 6, 2004, Copyright 2004 Elsevier Ltd., 13 pages.

Kruegel et al., "Using Decision Trees to Improve Signature-Based Intrusion Detection", RAID 2003, LNCS 2820, pp. 173-191, 2003, Copyright Springer-Verlag Berlin Heidelberg 2003.

Schultz et al., "Data Mining Methods for Detection of New Malicious Executables", 2001 IEEE Symposium on Security and Privacy, May 2000, DOI: 10.1109/SECPRI.2001.924286, 12 pages.

Su et al., "A real-time network intrusion detection system for large-scale attacks based on an incremental mining approach", Computers & Security, vol. 28, Issue 5, Jul. 2009, pp. 301-309, Abstract Only.

Mell et al., "The NIST Definition of Cloud Computing", Recommendations of the National Institute of Standards and Technology, U.S. Department of Commerce, Sep. 2011, 7 pages.

Notification of Transmittal of the International Search Report and the Written Opinion of the International Searching Authonty or the Declaration, Feb. 27, 2019, International Application No. PCT/IB2018/058624, 9 pages.

Hagi et al., "Anomaly Detection Using Cognitive Computing", U.S. Appl. No. 15/810,367, filed Nov. 13, 2017.

IBM, List of IBM Patents or Patent Applications Treated as Related, Apr. 25, 2019, 2 pages.

\* cited by examiner

ANOMALY DETECTION USING COGNITIVE COMPUTING

BACKGROUND

The present disclosure relates to computer security, and, more specifically, to anomaly detection systems.

Anomaly detection systems can be used as one component of a cybersecurity system configured to preserve confidentiality, integrity, and/or availability of data stored in, executed on, and/or communicated between data processing systems. For example, anomaly detection systems can identify insecure, unexpected, abnormal, suspicious, malicious, and/or unauthorized activity occurring within, between, or throughout portions of a cybersecurity environment.

SUMMARY

Aspects of the present disclosure are directed toward a computer-implemented method comprising generating a plurality of tensors based on spatial attributes of a set of cybersecurity data and temporal attributes of the set of cybersecurity data. The set of cybersecurity data can comprise numeric data and textual data collected from a plurality of computational sources. The method can further comprise providing the plurality of tensors to a Hierarchical Temporal Memory (HTM) network configured to generate respective HTM outputs for respective regions of the HTM network based on active nodes for respective regions of the HTM network. The method can further comprise determining that at least one HTM output indicates an anomaly, converting the at least one HTM output to a notification, and providing the notification to a user interface.

Further aspects of the present disclosure are directed toward a computer system comprising a processor and a tangible, computer-readable memory for storing program instructions which, when executed by the processor, perform a method comprising generating a plurality of tensors based on spatial attributes of a set of cybersecurity data and temporal attributes of the set of cybersecurity data. The set of cybersecurity data can comprise numeric data and textual data collected from a plurality of computational sources. The method can further comprise providing the plurality of tensors to a Hierarchical Temporal Memory (HTM) network configured to generate respective HTM outputs for respective regions of the HTM network based on active nodes for respective regions of the HTM network. The method can further comprise determining that at least one HTM output indicates an anomaly, converting the at least one HTM output to a notification, and providing the notification to a user interface.

Further aspects of the present disclosure are directed toward a computer program product comprising a computer readable storage medium having program instructions executable by a processor to cause the processor to perform a method comprising generating a plurality of tensors based on spatial attributes of a set of cybersecurity data and temporal attributes of the set of cybersecurity data. The set of cybersecurity data can comprise numeric data and textual data collected from a plurality of computational sources. The method can further comprise providing the plurality of tensors to a Hierarchical Temporal Memory (HTM) network configured to generate respective HTM outputs for respective regions of the HTM network based on active nodes for respective regions of the HTM network. The method can further comprise determining that at least one HTM output indicates an anomaly, converting the at least one HTM output to a notification, and providing the notification to a user interface.

Further aspects of the present disclosure are directed toward a system comprising a security information and event management (SIEM) system receiving security data and storing the security data for a plurality of devices in an information technology (IT) environment, a hierarchical temporal memory (HTM) system comprising a HTM processor and a HTM memory, and a feature extraction system comprising a memory and a processor, wherein the memory stores instructions which, when executed by the processor, perform a method. The method comprises converting the security data to a plurality of spatial-temporal multi-dimensional arrays, where associations between aspects of the plurality of spatial-temporal multi-dimensional arrays and the security data are stored in a database of associations. The method can further comprise receiving at least one output multi-dimensional array from the HTM system in response to inputting the plurality of spatial-temporal multi-dimensional arrays to the HTM system. The method can further comprise performing natural language processing on a query received from a user interface communicatively coupled to the feature extraction system, where the query identifies at least one device of the plurality of devices in the IT environment. The method can further comprise generating an answer based on the query, the at least one output multi-dimensional array, and the database of associations, and presenting the answer to the user interface.

Further aspects of the present disclosure are directed toward a computer-implemented method comprising converting, using machine learning algorithms in a feature extraction system, security data to a plurality of spatial-temporal multi-dimensional arrays, where the security data is collected from, at least in part, a security information and event management (SIEM) system functioning in a cybersecurity environment communicatively coupling a plurality of computational devices. The plurality of spatial-temporal multi-dimensional arrays can be based, at least in part, on at least one sequence of computational events associated with at least a portion of the plurality of computational devices. The method can further comprise providing the plurality of spatial-temporal multi-dimensional arrays to a three-dimensional integrated circuit (3DIC) executing a Hierarchical Temporal Memory (HTM) network. The method can further comprise receiving, at the feature extraction system and from the HTM network, at least one output multi-dimensional array based, at least in part, on active nodes in a respective region of the HTM network. The method can further comprise identifying, using machine learning algorithms in the feature extraction system, at least one anomaly based on the at least one output multi-dimensional array, and reconfiguring, by the feature extraction system, at least one aspect of the cybersecurity environment in response to identifying the at least one anomaly. The method can further comprise presenting, by the feature extraction system and to a user interface communicatively coupled to the feature extraction system, a notification of the at least one anomaly.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
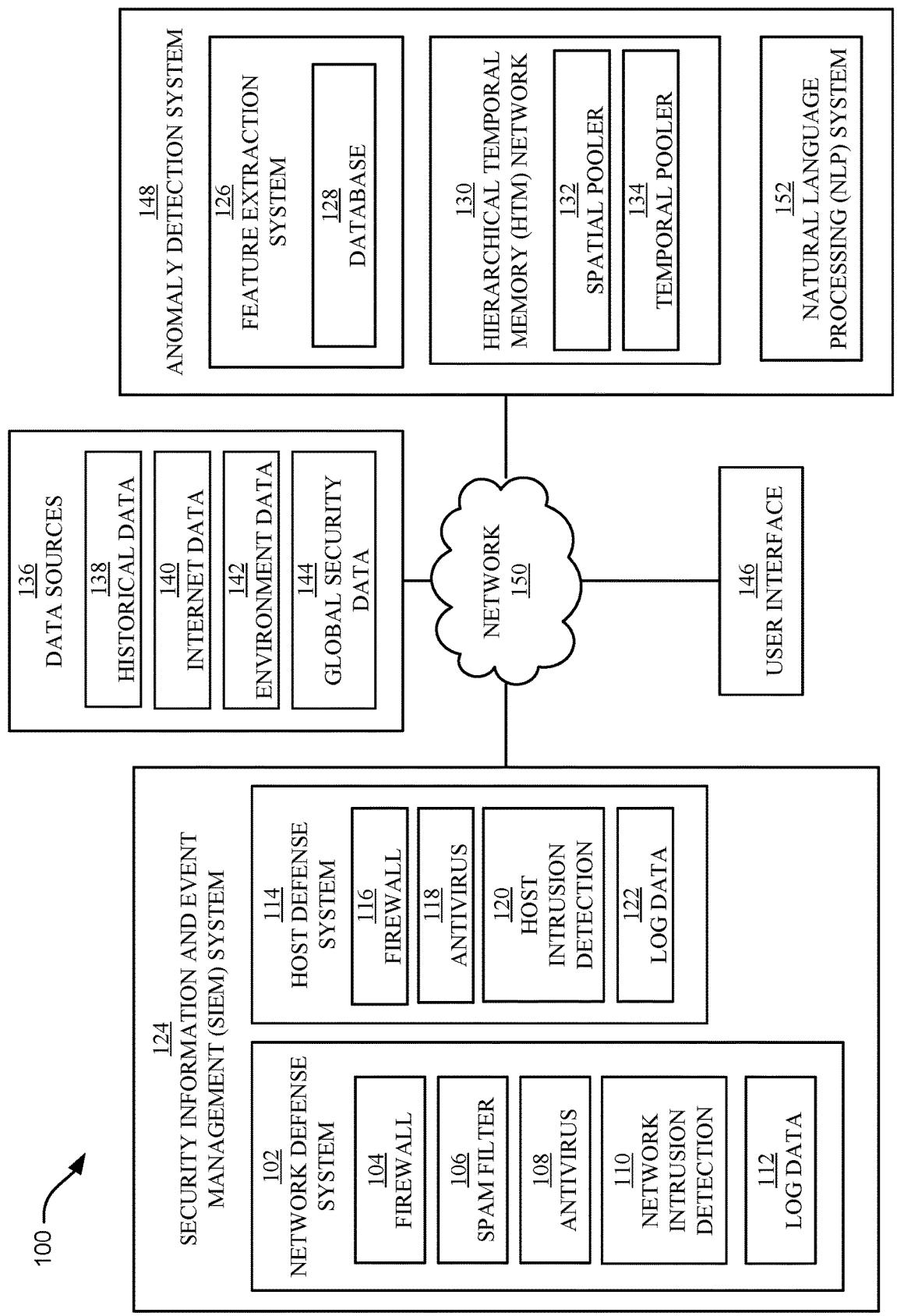
FIG. 1 illustrates a block diagram of an example cybersecurity environment in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, toward anomaly detection systems. While the present disclosure is not necessarily limited to such applications, various aspects of the present disclosure may be appreciated through a discussion of various examples using this context.

Aspects of the present disclosure are directed toward compiling heterogeneous cybersecurity data (e.g., log data, network data, computer data, application data, user behavior data, hardware data, etc.), transforming the heterogeneous cybersecurity data into homogenous data, storing the homogenous data in arrays, inputting the arrays to a hierarchical temporal memory (HTM) network, analyzing the output of the HTM network, and conveying relevant cybersecurity information to a user (e.g., using a Question and Answer (Q&A) system, a report, an infographic, a chart, a message, an alert, an anomaly score, a probability, etc.).

Aspects of the present disclosure exhibit numerous advantages. As a first example advantage, aspects of the present disclosure exhibit increased accuracy in detecting anomalies (e.g., fewer false positives and/or fewer false negatives). This example advantage can be realized, in part, by the large amount of data collected by a feature extraction system and provided to the HTM network. For example, the feature extraction system can transform heterogeneous data (e.g., log data, antivirus data, network data, hardware data, etc.) to homogenous data (e.g., vector space models (VSMs), tensors, spatial-temporal multi-dimensional arrays, and/or sparse distributed representations (SDRs)). Thus, aspects of the present disclosure can improve accuracy in anomaly detection systems by utilizing a large amount of otherwise incompatible data.

As a second example advantage, aspects of the present disclosure detect a variety of anomalies. For example, aspects of the present disclosure continuously detect anomalous behavior at low levels (e.g., anomalous behavior occurring in a single application operating on a single computer) and at high levels (e.g., anomalous behavior occurring in a network coupling thousands of computers). This advantage can be realized, in part, by the variety of data collected, transformed, and processed by the HTM network, and further, by the continuous predictions generated at all levels in the HTM network.

As a third example advantage, aspects of the present disclosure provide information as needed, thereby improving usability of an anomaly detection system. For example, a user (e.g., a security analyst) can query a natural language processing (NLP) system, the NLP system can identify appropriate data analytic algorithm(s) to retrieve appropriate HTM output, and the NLP system can formulate an appropriate answer to the query based on the analyzed HTM output provided by the executed data analytic algorithm(s). This advantage can be realized, in part, by the NLP system which can provide intelligible information on an as needed basis. As understood by one skilled in the art, raw HTM output (e.g., an array based on active and inactive nodes in a portion of a HTM network) is incomprehensible to a user (e.g., a user may be unable to decipher the meaning of the HTM output without the assistance of the NLP system and data analytic algorithm(s) performed by a feature extraction system).

As a fourth example advantage, aspects of the present disclosure reduce processing overhead, reduce power usage, and/or reduce memory usage by efficiently inputting data into the HTM network. For example, aspects of the present disclosure can compile otherwise incompatible cybersecurity data into VSMs, tensors, spatial-temporal multi-dimensional arrays, and/or SDRs, thereby simultaneously analyzing an entire set of data using a similar technique (e.g., HTM networks) rather than independently analyzing multiple subsets of data using different techniques.

As a fifth example advantage, aspects of the present disclosure are tolerant to hardware faults. For example, the HTM network can be implemented using a three-dimensional integrated circuit (3DIC) to expedite processing speed. However, as is understood by one skilled in the art, 3DICs can be prone to hardware faults (e.g., due to yield challenges). Advantageously, HTM networks are fault tolerant because HTM networks generate outputs based on patterns of data rather than individual data points. Thus, even numerous faults in a 3DIC can have negligible impact on the overall pattern of data used to generate HTM outputs.

The aforementioned advantages are example advantages, and aspects of the present disclosure exist that can contain all, some, or none of the aforementioned advantages while remaining within the spirit and scope of the present disclosure.

Referring now to FIG. 1, illustrated is a block diagram of an example cybersecurity environment in accordance with some embodiments of the present disclosure. In embodiments, cybersecurity environment 100 (e.g., an information technology (IT) environment, a private network, a public network, a set of communicatively coupled computational devices, etc.) includes one or more security information and event management (SIEM) systems 124. SIEM system 124 can be, but is not limited to, International Business Machines Corporation (IBM) product QRADAR. SIEM system 124 collects data from one or more network defense systems 102 including, for example, a firewall 104, a spam filter 106, an antivirus 108, a network intrusion detection system (NIDS) 110, and log data 112. SIEM system 124 likewise gathers data from one or more host defense systems 114 including, for example, a firewall 116, an antivirus 118, a host intrusion detection system (HIDS) 120, and log data 122. Log data (e.g., log data 112 and log data 122) can comprise, but is not limited to, log files generated for transaction logs, system logs (e.g., a syslog), operating system logs, message logs, event logs, application logs, network logs, end-user logs, and/or different log data.

SIEM system 124 collects both numeric data and textual data. Numeric data can be, but is not limited to, network addresses, (e.g., internet protocol (IP) addresses), serial numbers, port numbers, performance data (e.g., CPU speed, CPU capacity, memory usage, etc.), command codes, error codes, times, dates, durations, and/or other numeric data. Textual data can be, but is not limited to, commands, messages, names, identifiers, errors, and/or other textual data.

Although one STEM system 124 is shown, cybersecurity environment 100 can include numerous SIEM systems 124. In some embodiments, data is collected from a simple network management protocol (SNMP) trap and/or an intrusion detection and prevention system (IDPS) in addition to, or as an alternative to, STEM system 124. Some embodiments of the present disclosure do not include STEM system 124 and instead collect data directly from computational devices functioning in cybersecurity environment 100. Computational devices can include, for example, routers, hubs, servers, computers, desktops, laptops, tablets, smartphones, handheld devices, wearable devices, and/or other computational devices.

Data collected by STEM system 124 is input to anomaly detection system 148. Feature extraction system 126, hierarchical temporal memory (HTM) network 130, and natural language processing (NLP) system 152 physically or virtually reside in anomaly detection system 148. Although shown as separate entities for clarity, in some embodiments, feature extraction system 126, HTM network 130, and/or NLP system 152 are integrated in a same entity having machine learning, feature extraction, HTM, and/or NLP capabilities.

Feature extraction system 126 can be, but is not limited to, IBM WATSON. Although not shown, feature extraction system 126 executes any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, feature extraction system 126 can be configured to perform machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Feature extraction system 126 is configured to retrieve the data generated by STEM system 124 and transform the data to a suitable format for Hierarchical Temporal Memory (HTM) network 130. Feature extraction system 126 can store a database 128 configured to store numeric values representing linguistic, semantic, syntactic, scalar, and/or measured characteristics of data collected by STEM system 124. For example, data retrieved from STEM system 124 can be converted to VSMs. In such an example, database 128 can store associations between portions of data and respective values of respective components of respective VSMs representing the portions of data. Database 128 is discussed in more detail with respect to FIG. 3.

Feature extraction system 126 provides the transformed data to HTM network 130. In some embodiments, the transformed data comprises one or more VSMs, one or more tensors, and/or one or more spatial-temporal multi-dimensional arrays. In some embodiments, the transformed data comprises one or more sparse distributed representations (SDRs) based on at least one VSM, at least one tensor, or at least one spatial-temporal multi-dimensional array.

As is understood by one skilled in the art, HTM is a technique for machine learning. HTM networks can exhibit characteristics similar to the neocortex of the human brain. For example, a HTM network can be represented as a tree-shaped hierarchy having multiple levels. Data can be input into the lower levels, and the output from lower levels can be used as input for higher levels. Each level can comprise one or more regions. Lower levels can comprise more regions than higher levels. Each region can comprise a plurality of nodes (e.g., a region of a level can be a 16×16 square of nodes). Each node can comprise a column of cells (e.g., each node can comprise a column of three cells). HTM networks can learn based on patterns of active cells (or patterns of active nodes). An individual cell can be activated by a feed forward input (e.g., an input received from a lower level) or by an adjacent input (e.g., input received from a cell on the same level).

In embodiments, the HTM network 130 uses one or more spatial poolers 132 to format data and one or more temporal poolers 134 to predict a next pattern of active cells and/or nodes. In some embodiments, spatial pooler 132 is configured to convert the received data into a format suitable for HTM network 130. For example, spatial pooler 132 can reformat the data to a size suitable to the number of levels, regions, and/or nodes of HTM network 130. As another example, spatial pooler 132 can reformat the data to at least one different data structure exhibiting increased information efficiency. For example, spatial pooler 132 can generate one or more sparse distributed representations (SDR) of the input data. In such an example, the SDR can be input to a region of HTM network 130 by activating a set of cells in a respective region of HTM network 130 based on the SDR of the input data. In alternative embodiments, feature extraction system 126 provides appropriately formatted data directly to HTM network 130.

Temporal pooler 134 is configured to predict a next received input (e.g., a next set of active cells or active nodes). Temporal pooler 134 makes continuous predictions for each region of each level of the HTM network 130. The HTM network 130 learns based on observing patterns associated with correct predictions and patterns associated with incorrect predictions over time. In some embodiments, the present disclosure identifies anomalous behavior based on the temporal pooler 134 making one or more incorrect predictions. An incorrect prediction can imply abnormal behavior of the input data. In alternative embodiments, the present disclosure identifies anomalous behavior based on temporal pooler 134 making one or more predictions suggestive of anomalous behavior (e.g., predictions matching a known anomalous pattern).

In some embodiments, the output of the HTM network 130 comprises an array representing active cells (or nodes) of a given region of HTM network 130. In some embodiments, the output of the HTM network 130 comprises an array representing differences between a predicted pattern of active cells in a respective region of the HTM network 130 and an observed pattern of active cells in the respective region of the HTM network 130. In some embodiments, the output of the HTM network 130 comprises an array representing matches between a predicted pattern of active cells in a respective region of the HTM network 130 and a known anomalous pattern of active cells in the respective region of the HTM network 130.

In some embodiments, HTM network 130 is implemented using integrated circuits (ICs). In some embodiments, HTM network 130 uses three-dimensional ICs (3DICs). For example, HTM network 130 can be implemented using 3D wafer-level packaging (3DWLP), 3D interposer based integration, 3D stacked ICs (3D-SICs), monolithic 3D ICs, 3D heterogeneous integration, 3D system in package (3DSiP), package on package (PoP), other 3DIC structures, and/or other structures providing functionality similar to 3DICs. As previously discussed, 3DICs can be advantageous for generating HTM network 130 because 3DICs can provide improved computational power and speed than otherwise available. Although 3DICs historically suffer from higher-than-normal hardware faults (e.g., due to yield challenges during manufacture), HTM network 130 is resistant to hardware faults because HTM network 130 learns based on patterns of activity rather than specific instances of activity. Thus, HTM network 130 can provide accurate output despite malfunctioning nodes in HTM network 130.

Outputs from various regions and levels in HTM network 130 are input into feature extraction system 126 for post-processing. Feature extraction system 126 can use database 128 to convert the numeric data output by HTM network 130 into usable information. Feature extraction system 126 can also compile data from various data sources 136 to provide additional context for the output of HTM network 130.

In embodiments, data sources 136 include, but are not limited to, historical data 138, internet data 140, environment data 142, and/or global security data 144. Historical data 138 can include, but is not limited to, historical data related to HTM network 130 (e.g., prior inputs, prior outputs, known anomalous behavior patterns, etc.). Internet data 140 can include, but is not limited to, news data, social media data, or other data available on the internet. Environment data 142 can include, but is not limited to, numbers, types, versions, and/or models of hardware, software, firmware, operating systems, and/or other physical or virtual components functioning in cybersecurity environment 100. Environment data 142 can further include cybersecurity protocols, policies, and/or procedures associated with the components providing data to feature extraction system 126 and/or HTM network 130. Global security data 144 can include, but is not limited to, data related to cybersecurity threats, weaknesses, attacks, methods, techniques, strategies, best practices, lessons learned, and/or other data related to global cybersecurity.

In some embodiments, data received from HTM network 130 and post-processed by feature extraction system 126 is output to a user interface 146 (e.g., as a warning, a score, a probability, an infographic, a chart, a report, etc.). In some embodiments, data received from HTM network 130 and post-processed by feature extraction system 126 is sent to NLP system 152 for further processing.

NLP system 152 interacts with user interface 146. NLP system 152 can generate and present reports, infographics, answers, and/or warnings to user interface 146 based on the data post-processed by feature extraction system 126 and/or data sources 136. User interface 146 can present information to a user (e.g., a security analyst). As an example, NLP system 152 can receive a question from user interface 146, convert the question to a format suitable for querying the HTM network 130 via the feature extraction system 126, execute appropriate data analytic algorithm(s) to retrieve HTM output from a relevant portion of HTM network 130, convert the retrieved output to an answer, and provide the answer to the user interface 146. In some embodiments, the answer is further based on machine learning insights gathered from data sources 136. In some embodiments, the answer comprises textual data (e.g., formatted as a sentence) and/or numeric data (e.g., an amount, a range, an identifier, a probability, and/or a confidence).

NLP system 152 performs any number of machine learning algorithms as previously described with respect to feature extraction system 126. Although not shown, NLP system 152 can include machine learning and natural language processing capabilities such as, but not limited to, lemmatization, morphological segmentation, part-of-speech (POS) tagging, parsing, sentence boundary disambiguation, stemming, segmentation, terminology extraction, semantic analysis, sentiment analysis, optical character recognition, word sense disambiguation, speech recognition, text-to-speech processing, and/or other techniques. In some embodiments, NLP system 152 is IBM WATSON.

SIEM system 124, feature extraction system 126, HTM network 130, NLP system 152, data sources 136, and user interface 146 are connected by network 150. Network 150 can be a physical network, a virtual network, or a combination of physical and virtual networks. Although not shown, network 150 can further interconnect numerous computational devices (e.g., the computational devices generating data collected by STEM system 124) such as, but not limited to, routers, hubs, servers, desktops, laptops, data processing systems, computers, tablets, handheld devices, wearable devices, smartphones, and/or other computational devices.

FIG. 1 is intended to represent the major components of an example cybersecurity environment 100 according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1.

Figure 2:
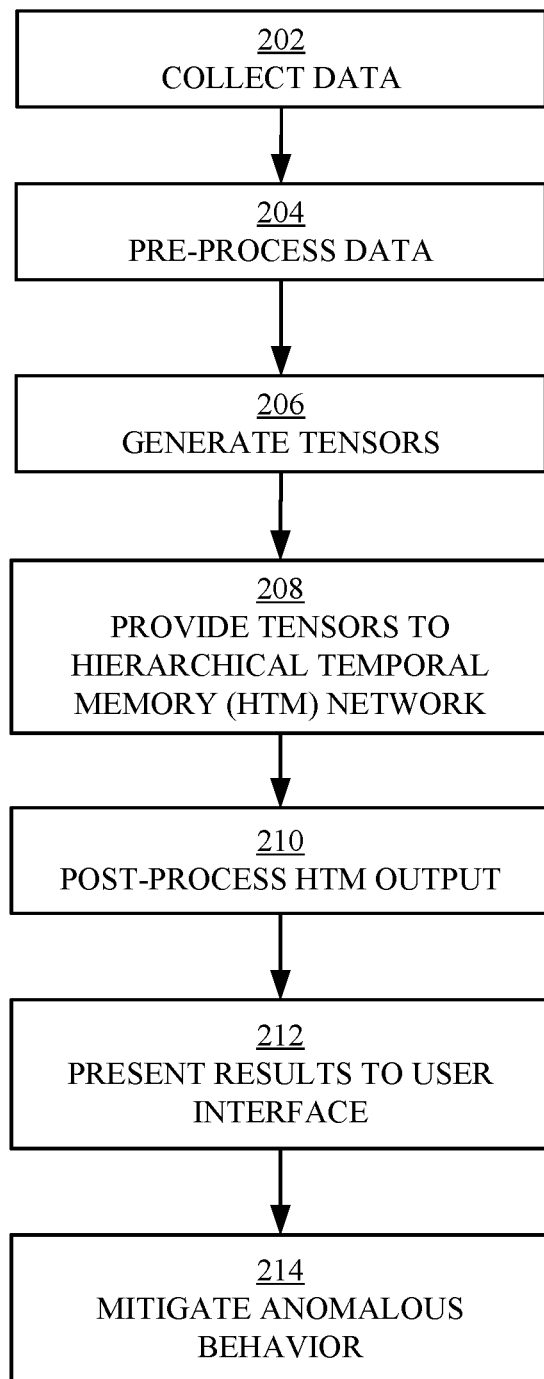
FIG. 2 illustrates a flowchart of an example method for anomaly detection in accordance with some embodiments of the present disclosure.

Referring now to FIG. 2, illustrated is a flowchart of an example method for anomaly detection in accordance with some embodiments of the present disclosure. The method 200 can be performed by, for example, one or more processors, an anomaly detection system (e.g., anomaly detection system 148 of FIG. 1), a feature extraction system (e.g., feature extraction system 126 of FIG. 1), or a different configuration of hardware. For clarity, the method 200 will hereinafter be described as being performed by an anomaly detection system, however, aspects of the present disclosure can be performed by other hardware components or combinations of hardware components.

In operation 202, the anomaly detection system collects cybersecurity data. Cybersecurity data can be collected from, for example, log files (e.g., syslogs, operating system (OS) logs, event logs, application logs, network logs, transaction logs, communication logs, and/or other log files), SIEM systems, SNMP traps, IDP systems, networks, routers, computers, laptops, tablets, handheld devices, wearable devices, mobile phones, applications, operating systems, firewalls, spam filters, antivirus applications, network intrusion detection systems (NIDS), host intrusion detection systems (HIDS), and/or other sources generating data relevant to a cybersecurity environment. In various embodiments, the anomaly detection system can collect cybersecurity data from individual components and/or from one or more aggregation points (e.g., a SIEM system).

In operation 204, the anomaly detection system pre-processes the cybersecurity data collected in operation 202. Pre-processing the cybersecurity data can include, but is not limited to, filtering (e.g., cleansing), integrating, and/or organizing the cybersecurity data. Filtering can refer to, but is not limited to, removing corrupt, inaccurate, or otherwise undesirable data. For example, aspects of the present disclosure can filter duplicate data. Integrating can refer to, but is not limited to, combining data from heterogeneous sources into logical groups. For example, aspects of the present disclosure can integrate data retrieved from numerous computers operating on a same internal network into a logical group of data associated with the same internal network. Organizing can refer to, but is not limited to, ordering and/or simplifying relevant data. For example, received data can be ordered by size, time, type, or a different metric. In another example, received numeric data can be rounded to a pre-determined precision (e.g., rounding decimals to a nearest tenth or hundredth).

In operation 206, the anomaly detection system generates one or more tensors by encoding the pre-processed data into respective tensors. In some embodiments, the tensors (also referred to as spatial-temporal multi-dimensional arrays herein) are made up of one or more VSMs. Respective VSMs can be generated based on numeric data and textual data pre-processed in operation 204. In some embodiments, tensors can combine timestamps with the VSMs to generate tensors associated with sequences of time. In some embodiments, respective tensors can comprise clustered log features (expressed as VSM matrices) that have been categorized and processed into numerical values. Thus, the tensors can numerically represent the attributes of event data across multiple spatial bases and temporal bases. Spatial bases can be, for example, a particular value matrix of a system event occurring at different locations in a cybersecurity environment. Different locations in a cybersecurity environment can be identified by, for example, source machine addresses (e.g., IP addresses), destination machine addresses, port numbers, protocol numbers, machine location (e.g., within a data center or network), data center location (e.g., geographic location), and so on. Temporal bases can be, for example, time, date, sequences (e.g., scheduled computer instructions queued in a running program), protocol sequence numbers (e.g., serialization and sequencing of communication protocol messages), and so on. Operation 206 is described in more detail with respect to FIG. 3.

In some embodiments, the anomaly detection system converts the tensors into sparse distributed representation(s) (SDRs). As understood by one skilled in the art, SDRs comprise a subset of the input data where the subset of the input data retains an appropriate amount of information in a reduced amount of data.

In operation 208, the anomaly detection system provides the tensors (or SDRs) to a HTM network (e.g., HTM network 130 of FIG. 1) for anomaly detection score processing. The HTM network can comprise numerous levels, where each level comprises one or more regions, where each region comprises a plurality of nodes, and where each node comprises a column of cells. Higher levels can comprise fewer regions (and fewer nodes and fewer cells) than lower regions. One or more regions in a lower level can provide output as input to one or more regions in a higher level. In some embodiments, the HTM network can include a plurality of HTM hierarchies each receiving input based on a unique set of temporal and/or spatial data, and the plurality of HTM hierarchies can converge to a single, top-most level. For example, respective HTM hierarchies can exist for processing a certain type of data (e.g., syslog data), or a certain set of data (e.g., all data collected for a respective computer system). In embodiments, the collected data can be processed in various intervals (e.g., continuously (as it is received), one minute, one hour, and/or one day intervals). Each region of the HTM network can produce outputs as a result of processing the data in operation 208. Outputs can include, but are not limited to, arrays based on active cells and/or nodes in respective regions of the HTM network. With proper post-processing, the array outputs can indicate predictions, anomaly point detections, scores, pattern detection, pattern representation, and/or confidences (e.g., a percent confidence, a likelihood, a probability, or a different measure of confidence). Operation 208 is described in more detail with respect to FIG. 4.

In operation 210, the anomaly detection system post-processes the output generated by operation 208. The anomaly detection system can post-process the HTM results by converting the numeric outputs of the HTM network into usable data. For example, the anomaly detection system can convert an HTM output array to specific metrics (e.g., login attempts, network traffic) associated with a specific portion of the cybersecurity environment (e.g., an application functioning on a computer). In some embodiments, the anomaly detection system determines if the HTM output indicates an anomaly in operation 210. In some embodiments, the anomaly detection system gathers additional data from other data sources (e.g., data sources 136 of FIG. 1) such as, but not limited to, historical data, internet data, environment data, and/or global security data. Operation 210 is described in more detail hereinafter with respect to FIG. 5.

In operation 212, the anomaly detection system presents results to a user interface (e.g., user interface 146 of FIG. 1). In some embodiments, the anomaly detection system converts the post-processed HTM output to a notification such as a report, a warning, an infographic, an answer to a question, or in a different format. Operation 212 is described in more detail with respect to FIG. 6.

In operation 214, the anomaly detection system automatically (or in response to user input) mitigates an anomaly by reconfiguring a cybersecurity environment. For the purposes of the present disclosure, reconfiguring the cybersecurity environment can refer to virtually or physically altering the cybersecurity environment such that the cybersecurity environment exhibits altered functionality (e.g., altered capability, altered performance) as a result of the reconfiguration. For example, a reconfiguration can result in reduced functionality and improved security for the cybersecurity environment. An anomaly can be mitigated by, for example, isolating a portion of the cybersecurity environment associated with the anomaly. For example, the anomaly detection system can automatically isolate a computer from a network in response to identifying an anomaly occurring at the computer.

FIG. 2 is intended to represent the major operations of an example method for anomaly detection in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
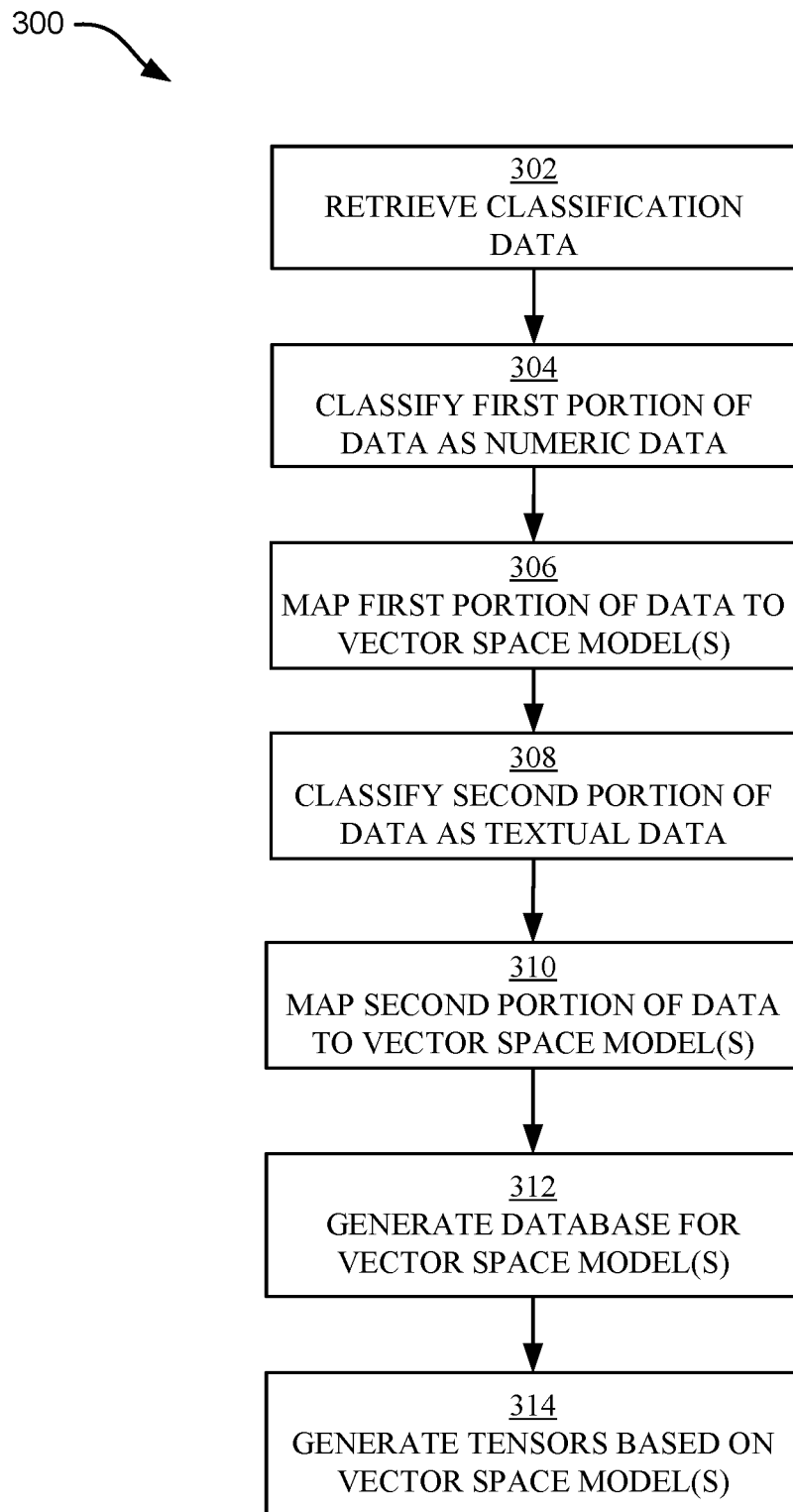
FIG. 3 illustrates a flowchart of an example method for generating tensors in accordance with some embodiments of the present disclosure.

Referring now to FIG. 3, illustrated is a flowchart of an example method for generating tensors in accordance with some embodiments of the present disclosure. In some embodiments, the method 300 is a sub-method of operation 206 of FIG. 2. The method 300 can be performed by, for example, one or more processors, an anomaly detection system (e.g., anomaly detection system 148 of FIG. 1), a feature extraction system (e.g., feature extraction system 126 of FIG. 1), or a different configuration of hardware. For clarity, the method 300 will hereinafter be described as being performed by an anomaly detection system, however, aspects of the present disclosure can be performed by other hardware components or combinations of hardware components.

In operation 302, the anomaly detection system retrieves classification data. Classification data can comprise a classification knowledge dictionary assisting in semantic analysis and feature extraction. Classification data can indicate, for example, types of data (e.g., numeric data vs. textual data) and classes of data (e.g., network data vs. antivirus data).

In operation 304, the anomaly detection system classifies a first portion of the pre-processed data as numeric data. Numeric data can be, for example, processor (CPU) load, addresses (e.g., IP addresses), port numbers, command codes, error codes, times, durations, protocol identifiers, and/or other numeric data.

In operation 306, the anomaly detection system maps the first portion of data to one or more vector space models (VSMs). As is understood by one skilled in the art, a VSM represents objects as multi-dimensional vectors. A VSM can include any number of components where each component stores a value. Each combination of value and component can represent part of the first portion of data. A VSM based on numeric data can store the numeric values in selected components of the VSM. For example, a first component can refer to a source IP address, a second component can refer to a destination IP address, a third component can refer to a packet size, and so on. Although the example VSM contains three components, embodiments of the present disclosure can generate VSMs that have more or fewer components than discussed in the aforementioned example.

In operation 308, the anomaly detection system classifies a second portion of the pre-processed data as textual data. Textual data can be, for example, commands, messages, names, identifiers, log data, errors, and/or other textual data. For example, in operation 308, the anomaly detection system can classify "https://ssl.google-analytics.com: 443*DENIED*Banned site" as textual data.

In operation 310, the anomaly detection system maps the second portion of data to VSMs. For example, the anomaly detection system can convert the example textual data discussed above with respect to operation 308 to a vector of numbers such as "2 193479287 5 43 109820983" where each component of the vector is separated by a space. In the vector of numbers, the first component "2" can indicate an event category code (e.g., web proxy target site access notification). The second component "193479287" can represent a digest value of the target universal resource locator (URL) (e.g., a digest value of "https://ssl.google-analytics.com:443"). The third component "5" can represent a condition (e.g., an access denied condition). The fourth component "43" can represent a cause code for the condition (e.g., a banned site cause code). The fifth component "109820983" can represent a digest value of the banned site URL and/or domain (e.g., "google-analytics.com"). Although the previous example illustrates a VSM having five components (e.g., five dimensions), any number of components are possible.

In operation 312, the anomaly detection system generates a database correlating respective values in respective components of a VSM to the data they represent. For example, the database can store an association between the number "193479287" and the text "https://ssl.google-analytics.com: 443" for the second component of the example VSM.

In some embodiments, the anomaly detection system also stores associations between components of a VSM and property attributes of numeric data (e.g., VSMs generated based on numeric data in operation 306) in the same database or a different database. For example, the anomaly detection system can store an indication that a first component of a VSM can refer to a source IP address, a second component of the VSM can refer to a destination IP address, and a third component of the VSM can refer to a packet size.

In operation 314, the anomaly detection system generates at least one tensor based on at least one VSM. For example, multiple VSMs representing security data generated by a same event at different locations in a cybersecurity environment can be compiled into a tensor. In another example, multiple VSMs representing a sequence of time for a same set of security data can be compiled into a tensor. In another example, multiple VSMs representing all log data can be compiled into a tensor. Respective tensors can be associated with any number of dimensions based on the dimensions of respective VSMs and the number of respective VSMs used to generate respective tensors.

FIG. 3 is intended to represent the major operations of an example method for generating tensors in accordance with some embodiments of the present disclosure. In some embodiments, however, individual operations can have greater or lesser complexity than shown in FIG. 3, and operations in addition to (or in substitution of) those shown in FIG. 3 can be present. Furthermore, in some embodiments, various operations illustrated in FIG. 3 can have greater, lesser, or different functionality than shown in FIG. 3. Furthermore, in some embodiments, various operations illustrated in FIG. 3 can occur in different orders, if they occur at all.

Figure 4:
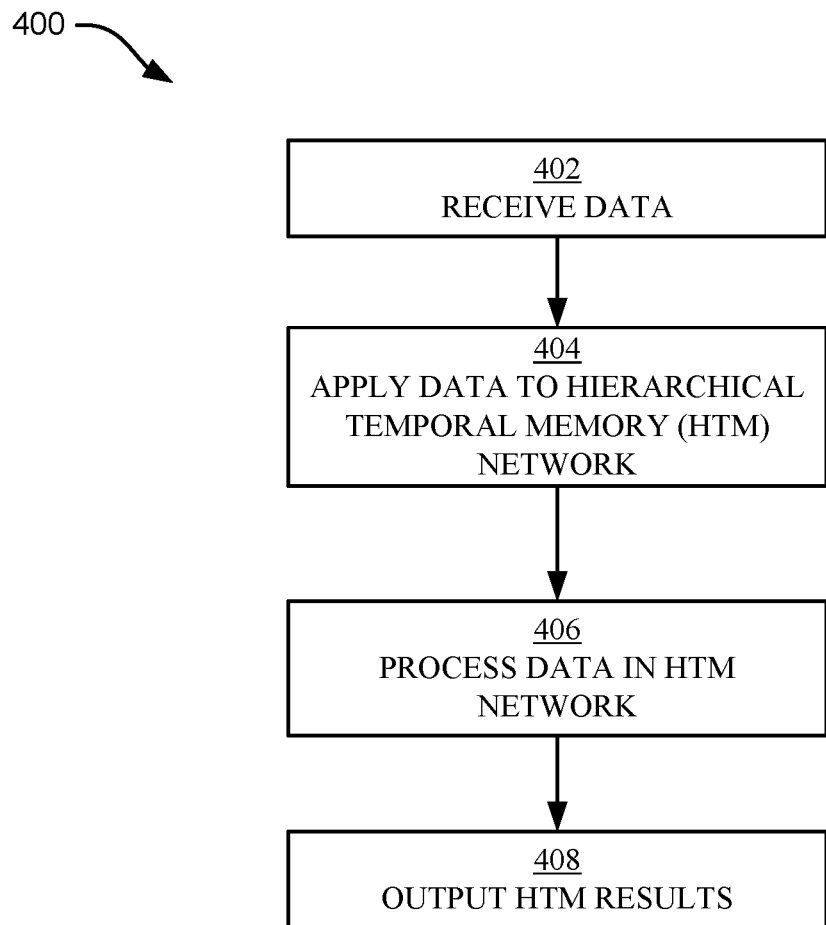
FIG. 4 illustrates a flowchart of an example method for anomaly score processing using a hierarchical temporal memory (HTM) network in accordance with some embodiments of the present disclosure.

Referring now to FIG. 4, illustrated is a flowchart of an example method for anomaly score processing using a hierarchical temporal memory (HTM) network in accordance with some embodiments of the present disclosure. In some embodiments, the method 400 is a sub-method of operation 208 of FIG. 2. The method 400 can be performed by, for example, one or more processors, an anomaly detection system (e.g., anomaly detection system 148 of FIG. 1), a HTM network (e.g., HTM network 130 of FIG. 1), or a different configuration of hardware. For clarity, the method 400 will hereinafter be described as being performed by an anomaly detection system, however, aspects of the present disclosure can be performed by other hardware components or combinations of hardware components.

In operation 402, the anomaly detection system receives data from a feature extraction system (e.g. feature extraction system 126 of FIG. 1) for processing by the HTM network. In some embodiments, the data comprises one or more tensors. The one or more tensors can be based on one or more VSMs generated using numeric data and textual data from a cybersecurity environment. In some embodiments, the data further comprises one or more SDRs based on one or more tensors. Respective tensors can numerically express attributes of data collected by the feature extraction system across spatial bases (e.g., different locations in a cybersecurity environment) and temporal bases (e.g., different times in a cybersecurity environment).

In operation 404, the anomaly detection system inputs the received data to a HTM network. Inputting the data to the HTM network can comprise activating selected cells and/or columns (also referred to as nodes) in a first layer of the HTM network based on the input data.

In operation 406, the anomaly detection system processes the data using the HTM network. In some embodiments, the anomaly detection system can apply the output from a region in a previous layer (e.g., a lower layer) of the HTM network to a region in a subsequent layer (e.g., a higher layer) of the HTM network. As is understood by one skilled in the art, the subsequent layer can be smaller than the previous layer (e.g., fewer regions, nodes, cells, and/or columns). Providing output from a previous layer as input to a subsequent layer can comprise activating respective cells and/or columns in the subsequent layer based on a pattern of active cells and/or columns in the previous layer. Operation 406 can include processing data for any number of layers and regions in the HTM network.

In operation 408, the anomaly detection system outputs the results from respective regions of respective layers of the HTM network to the feature extraction system. Outputs can include, but are not limited to, arrays based on active nodes and inactive nodes in respective regions of the HTM network. The outputs can represent, for example, predictions, confidences, anomaly detection, pattern detection, pattern representation, a local score, and/or a global score (e.g., a global environment anomaly score).

FIG. 4 is intended to represent the major operations of an example method for anomaly score processing using a HTM network in accordance with some embodiments of the present disclosure. In some embodiments, however, individual operations can have greater or lesser complexity than shown in FIG. 4, and operations in addition to (or in substitution of) those shown in FIG. 4 can be present. Furthermore, in some embodiments, various operations illustrated in FIG. 4 can have greater, lesser, or different functionality than shown in FIG. 4. Furthermore, in some embodiments, various operations illustrated in FIG. 4 can occur in different orders, if they occur at all.

Figure 5:
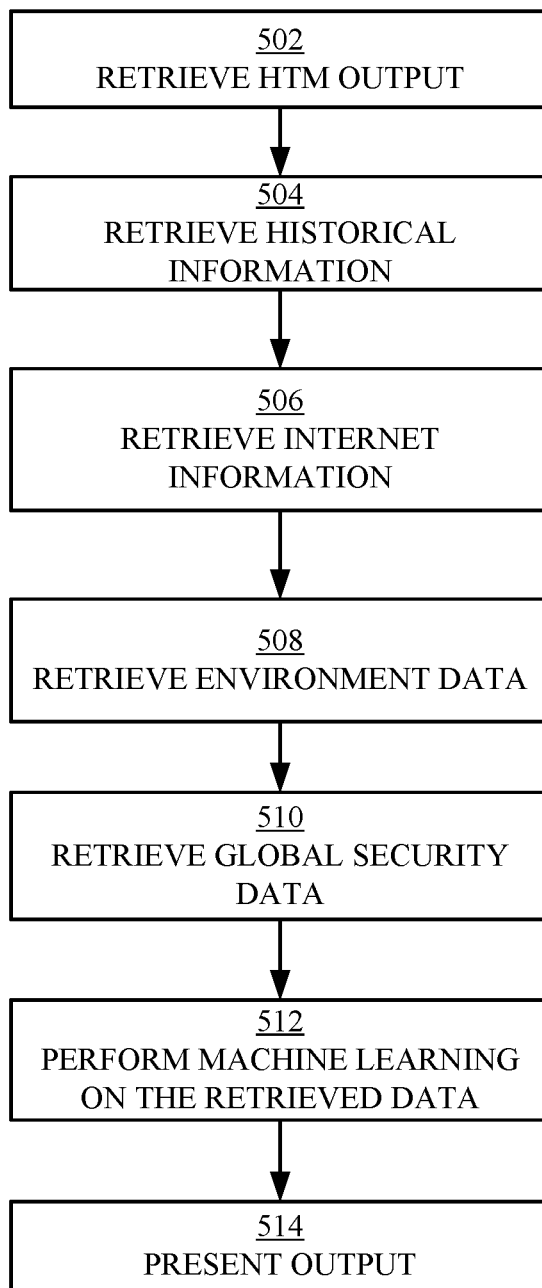
FIG. 5 illustrates a flowchart of an example method for presenting output from the anomaly detection system in accordance with some embodiments of the present disclosure.

Referring now to FIG. 5, illustrated is a flowchart of an example method for post-processing HTM data in accordance with some embodiments of the present disclosure. In some embodiments, the method 500 is a sub-method of operation 210 of FIG. 2. The method 500 can be performed by, for example, one or more processors, an anomaly detection system (e.g., anomaly detection system 148 of FIG. 1), a feature extraction system (e.g., feature extraction 126 of FIG. 1), or a different configuration of hardware. For clarity, the method 500 will hereinafter be described as being performed by an anomaly detection system, however, aspects of the present disclosure can be performed by other hardware components or combinations of hardware components.

In operation 502, the anomaly detection system retrieves the HTM output. HTM output can comprise numeric output (e.g., arrays) indicating prediction(s), confidence(s), score(s), and/or pattern(s) for any region or level of the HTM network. In some embodiments, the HTM output can be received in SDR format, tensor format, and/or VSM format. The HTM output can be based on active and/or inactive nodes in a given region of the HTM network, predicted active and/or inactive nodes in a given region of the HTM network, and/or a difference between predicted node activity and observed node activity in a given region of the HTM network.

In operation 504, the anomaly detection system retrieves historical information (e.g., historical data 138 of FIG. 1). Historical information can comprise, for example, previous inputs and/or outputs associated with the HTM network. The anomaly detection system can retrieve the historical data from a database stored in an internal storage or an external storage.

In operation 506, the anomaly detection system retrieves internet information (e.g., internet data 140 of FIG. 1). Internet information can comprise, for example, data retrieved from social media websites, news websites, or other information retrieved from the internet. For example, the anomaly detection system can retrieve information about an emerging ransomware attack from one or more news websites.

In operation 508, the anomaly detection system retrieves environment data (e.g., environment data 142 of FIG. 1). Environment data can comprise, but is not limited to, cybersecurity protocols, cybersecurity policies, cybersecurity procedures, known weaknesses, known threats, or other information related to configurations, models, and/or versions of servers, computers, laptops, tablets, handheld devices, wearable devices, smartphones, networks, routers, hubs, software, firmware, applications, operating systems, and/or other components functioning in the cybersecurity environment. The anomaly detection system can retrieve environment data from internal storage(s) and/or external storage(s).

In operation 510, the anomaly detection system retrieves global security data (e.g., global security data 144 of FIG. 1). Global security data can comprise, but is not limited to, data related to cybersecurity threats, weaknesses, attacks, methods, techniques, strategies, best practices, lessons learned, or other data related to global cybersecurity. Global security data can be retrieved from internal storage(s) and/or external storage(s).

In operation 512, the anomaly detection system performs machine learning on the data retrieved in operations 502-510. Machine learning can include techniques associated with augmented intelligence, artificial intelligence, and/or cognitive computing. For example, machine learning can include, but is not limited to, decision tree learning, association rule learning, artificial neural networks, deep learning, inductive logic programming, support vector machines, clustering, Bayesian networks, reinforcement learning, representation learning, similarity/metric learning, genetic algorithms, rule-based machine learning, natural language processing, a learning classifier system, and/or other techniques capable of generating relevant insights from a corpus of data.

For example, in some embodiments, operation 512 can use one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In operation 514, the anomaly detection system presents output from operation 512. The output can comprise prediction(s), confidence(s), anomaly detection(s), pattern(s), warning(s), score(s), or a different output. The output can be presented to a user interface (e.g., user interface 146 of FIG. 1), stored in a memory (e.g., stored in a historical data repository such as historical data 138 of FIG. 1), or transmitted to a different computer system.

FIG. 5 is intended to represent the major operations of an example method for post-processing HTM output in accordance with some embodiments of the present disclosure. In some embodiments, however, individual operations can have greater or lesser complexity than shown in FIG. 5, and operations in addition to (or in substitution of) those shown in FIG. 5 can be present. Furthermore, in some embodiments, various operations illustrated in FIG. 5 can have greater, lesser, or different functionality than shown in FIG. 5. Furthermore, in some embodiments, various operations illustrated in FIG. 5 can occur in different orders, if they occur at all.

Figure 6:
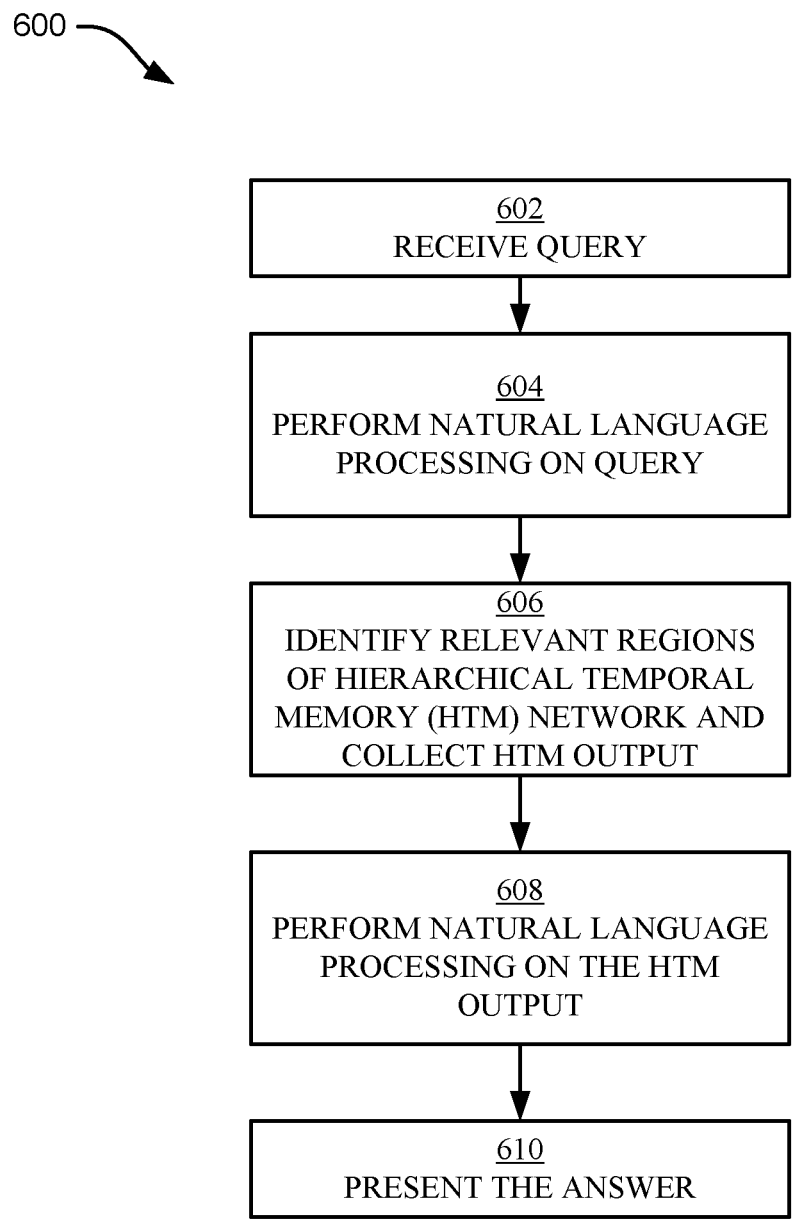
FIG. 6 illustrates a flowchart of an example method for querying an anomaly detection system in accordance with some embodiments of the present disclosure.

Referring now to FIG. 6, illustrated is a flowchart of an example method for querying the anomaly detection system in accordance with some embodiments of the present disclosure. In some embodiments, the method 600 is a sub-method of operation 212 of FIG. 2. The method 600 can be performed by, for example, one or more processors, an anomaly detection system (e.g., anomaly detection system 148 of FIG. 1), a natural language processing (NLP) system (e.g., NLP system 152 of FIG. 1) or a different configuration of hardware. For clarity, the method 600 will hereinafter be described as being performed by an anomaly detection system, however, aspects of the present disclosure can be performed by other hardware components or combinations of hardware components.

In operation 602, the anomaly detection system receives a query. The query can be received from, for example, a user interface (e.g., user interface 146 of FIG. 1). The query can be in the form of a question or a different form specifying a request for data.

In operation 604, the anomaly detection system performs natural language processing on the query to convert the query to a format suitable for querying the HTM network. In some embodiments, the anomaly detection system can use a database (e.g., database 128 of FIG. 1) to convert relevant text of the query to an appropriate VSM, tensor, and/or SDR as used by the HTM network. In some embodiments, the anomaly detection system identifies one or more appropriate data analytic algorithms to perform on the HTM output to retrieve an appropriate answer to the query.

In operation 606, the anomaly detection system identifies at least one relevant region of the HTM network based on the query. The anomaly detection system can retrieve one or more HTM outputs from the at least one relevant region of the HTM network (e.g., by executing an appropriate data analytic algorithm). HTM output can comprise VSMs, tensor(s), and/or SDR(s) representing prediction(s), confidence(s), score(s), pattern(s), or other data.

In operation 608, the anomaly detection system performs natural language processing on the information retrieved from the HTM network to convert the HTM output to a format suitable for presentation (e.g., an answer structured as a sentence). In some embodiments, operation 608 includes post-processing the HTM output using, for example, a database (e.g., database 128 of FIG. 1) to convert VSM(s), tensor(s), and/or SDR(s) into a response containing textual data and/or numeric data.

In operation 610, the anomaly detection system presents the answer to the user interface. In some embodiments, the answer is presented as a response to a question, a value, a report, a table, an infographic, or a different format.

As an example of the method 600, the anomaly detection system can receive a query such as, for example, "what is the number of expected login attempts on SECPRX2938.customer.com within the next 20 minutes?" (e.g., operation 602). The anomaly detection system can convert the received query to a format suitable for querying the HTM network (e.g., operation 604), retrieve HTM output from a relevant region of the HTM network (e.g., operation 606), convert the retrieved HTM output to an answer (e.g., operation 608), and present the answer to a user interface (e.g., operation 610). For example, the anomaly detection system can present the text "that host is expected to process approximately 159 login attempts over the next 20 minutes, with a confidence interval of 75.8%" in response to the example query discussed above.

FIG. 6 is intended to represent the major operations of an example method for querying an anomaly detection system in accordance with some embodiments of the present disclosure. In some embodiments, however, individual operations can have greater or lesser complexity than shown in FIG. 6, and operations in addition to (or in substitution of) those shown in FIG. 6 can be present. Furthermore, in some embodiments, various operations illustrated in FIG. 6 can have greater, lesser, or different functionality than shown in FIG. 6. Furthermore, in some embodiments, various operations illustrated in FIG. 6 can occur in different orders, if they occur at all.

Figure 7:
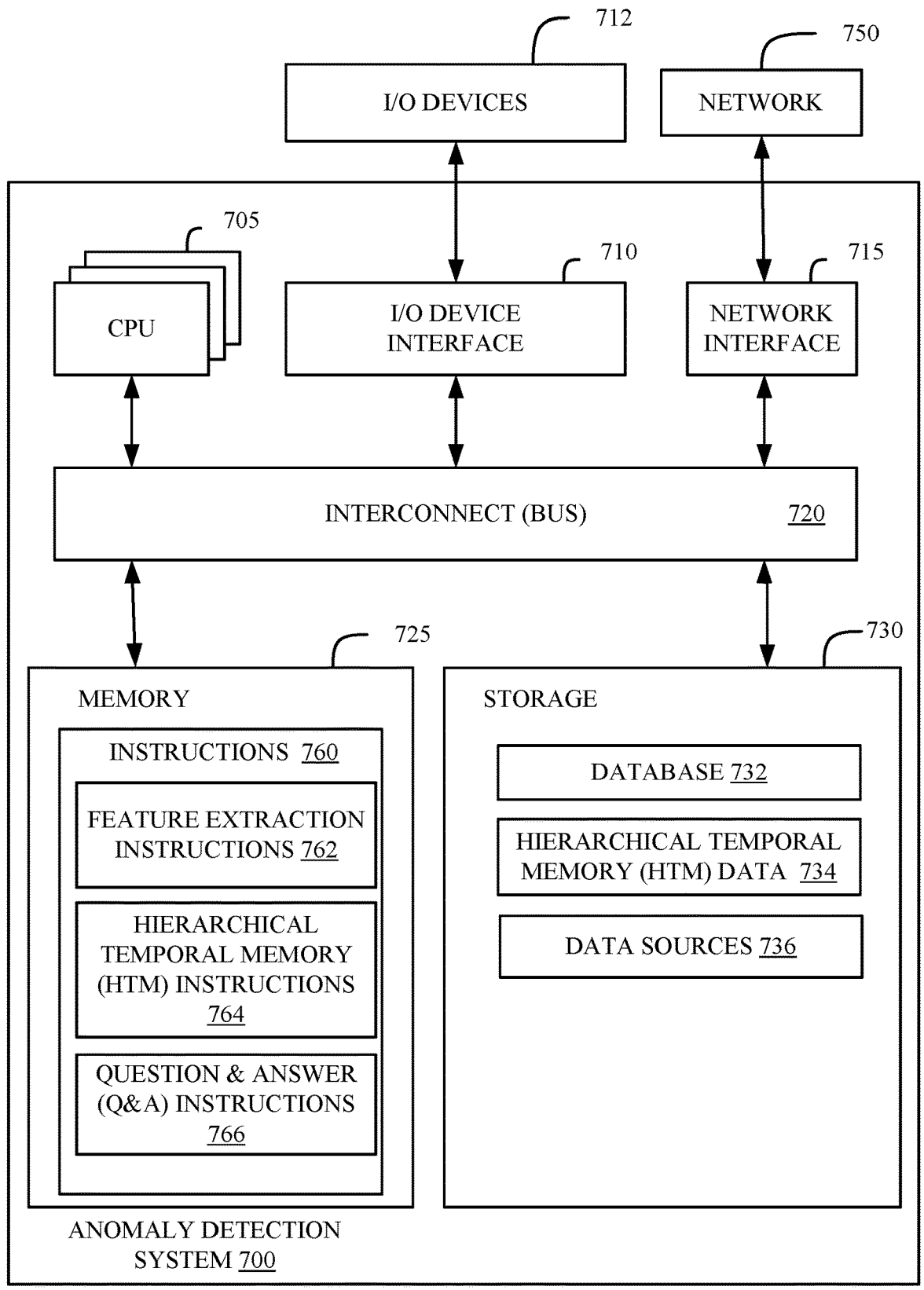
FIG. 7 illustrates a block diagram of an example anomaly detection system in accordance with some embodiments of the present disclosure.

FIG. 7 illustrates a block diagram of an anomaly detection system 700 in accordance with some embodiments of the present disclosure. In some embodiments, anomaly detection system 700 is consistent with anomaly detection system 148 of FIG. 1. In various embodiments, anomaly detection system 700 performs any of the methods described in FIGS. 2-6. In some embodiments, anomaly detection system 700 provides instructions for one or more of the methods described in FIGS. 2-6 to a client machine such that the client machine executes the method, or a portion of the method, based on the instructions provided by the anomaly detection system 700.

The anomaly detection system 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3DICs (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). In embodiments including a 3DIC, the 3DIC can be associated with processing HTM instructions 764 and/or producing HTM data 734. Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, or flash memory devices. In an alternative embodiment, the storage 730 can be replaced by storage area-network (SAN) devices, the cloud, or other devices connected to the anomaly detection system 700 via the I/O devices interface 710 or a network 750 via the network interface 715.

In some embodiments, the memory 725 stores instructions 760 and the storage 730 stores database 732, HTM data 734, and data sources 736. However, in various embodiments, the instructions 760, the database 732, the HTM data 734, and the data sources 736 are stored partially in memory 725 and partially in storage 730, or they are stored entirely in memory 725 or entirely in storage 730, or they are accessed over a network 750 via the network interface 715.

Database 732 can be consistent with database 128 of FIG. 1. Database 732 can store a database correlating textual data and numeric data to respective values of respective components of respective VSMs.

HTM data 734 can comprise data input to, or data output from, a HTM network (e.g., HTM network 130 of FIG. 1). HTM data 734 can comprise VSMs, tensors, and/or SDRs. In some embodiments, HTM data 734 can include data in a user-friendly format (e.g., text, reports, infographics, charts, warnings, and so on). HTM data 734 can include data input to and/or data output from any number of regions and/or layers of a HTM network.

Data sources 736 can include data sources collecting data from a cybersecurity environment (e.g., data collected by STEM system 124 of FIG. 1) and/or other data relevant to the cybersecurity environment (e.g., data sources 136 of FIG. 1) such as historical data, internet data, environment data, and/or global security data.

The instructions 760 are processor executable instructions including feature extraction instructions 762, HTM instructions 764, and question and answer (Q&A) instructions 766. Feature extraction instructions 762 can be executed by anomaly detection system 700 to collect data, transform data, interface with a HTM network, and/or interface with a user interface. Feature extraction instructions 762 can be configured to perform any of the methods previously discussed in FIGS. 2-3 and 5.

Feature extraction instructions 762 can include instructions to perform data analytic algorithms and/or perform machine learning on data. Feature extraction instructions 762 can include instructions for machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

Feature extraction instructions 762 can include algorithms or sets of algorithms capable of performing machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative matrix factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

HTM instructions 764 can be executed by anomaly detection system 700 to apply cybersecurity data to a HTM network in order to detect anomalous behavior based on patterns of data processed by the HTM network. HTM instructions 764 can be configured to perform the method discussed in FIG. 4 and/or generate HTM data 734. In some embodiments, HTM instructions 764 are implemented using a 3DIC.

Q&A instructions 766 can be executed by anomaly detection system 700 to present HTM data 734 in a user-friendly format. Q&A instructions 766 can include instructions for, for example, lemmatization, morphological segmentation, part-of-speech (POS) tagging, parsing, sentence boundary disambiguation, stemming, segmentation, terminology extraction, semantic analysis, sentiment analysis, optical character recognition, word sense disambiguation, speech recognition, text-to-speech processing, and/or other techniques useful for performing natural language processing (NLP). Q&A instructions 766 can be configured to perform the method described in FIG. 6.

In various embodiments, the I/O devices 712 include an interface capable of presenting information and receiving input. For example, I/O devices 712 can present information to a user (e.g., an anomaly score) interacting with anomaly detection system 700 and receive input from a user (e.g., a selected mitigation action).

Anomaly detection system 700 is connected to the network 750 via the network interface 715. In some embodiments, network 750 is consistent with network 150 of FIG. 1.

FIG. 7 is intended to represent the major components of an example anomaly detection system 700 according to embodiments of the present disclosure. In some embodiments, however, individual components can have greater or lesser complexity than shown in FIG. 7, and components other than, or in addition to those shown in FIG. 7 can be present. Furthermore, in some embodiments, various components illustrated in FIG. 7 can have greater, lesser, or different functionality than shown in FIG. 7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
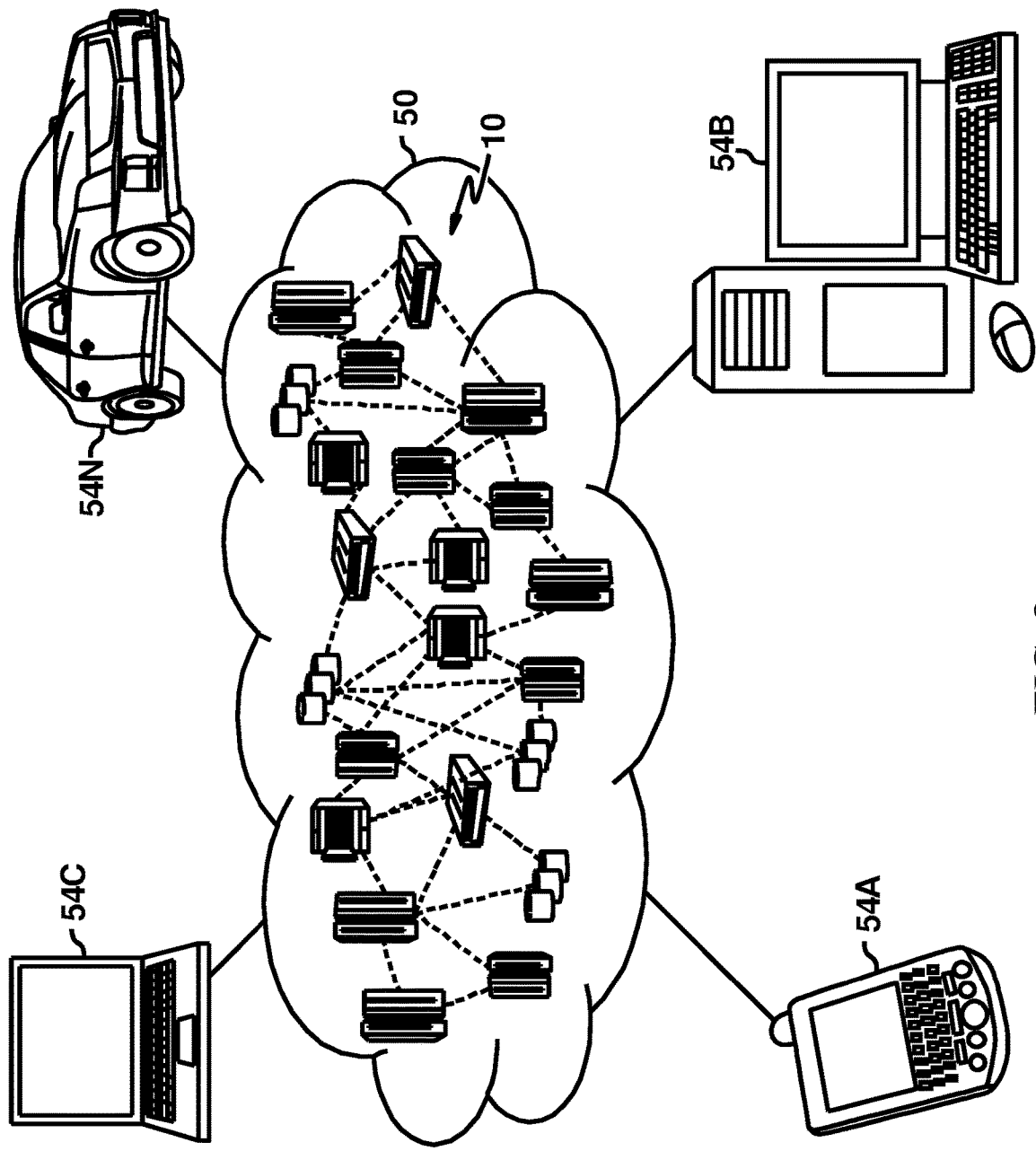
FIG. 8 depicts a cloud computing environment according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
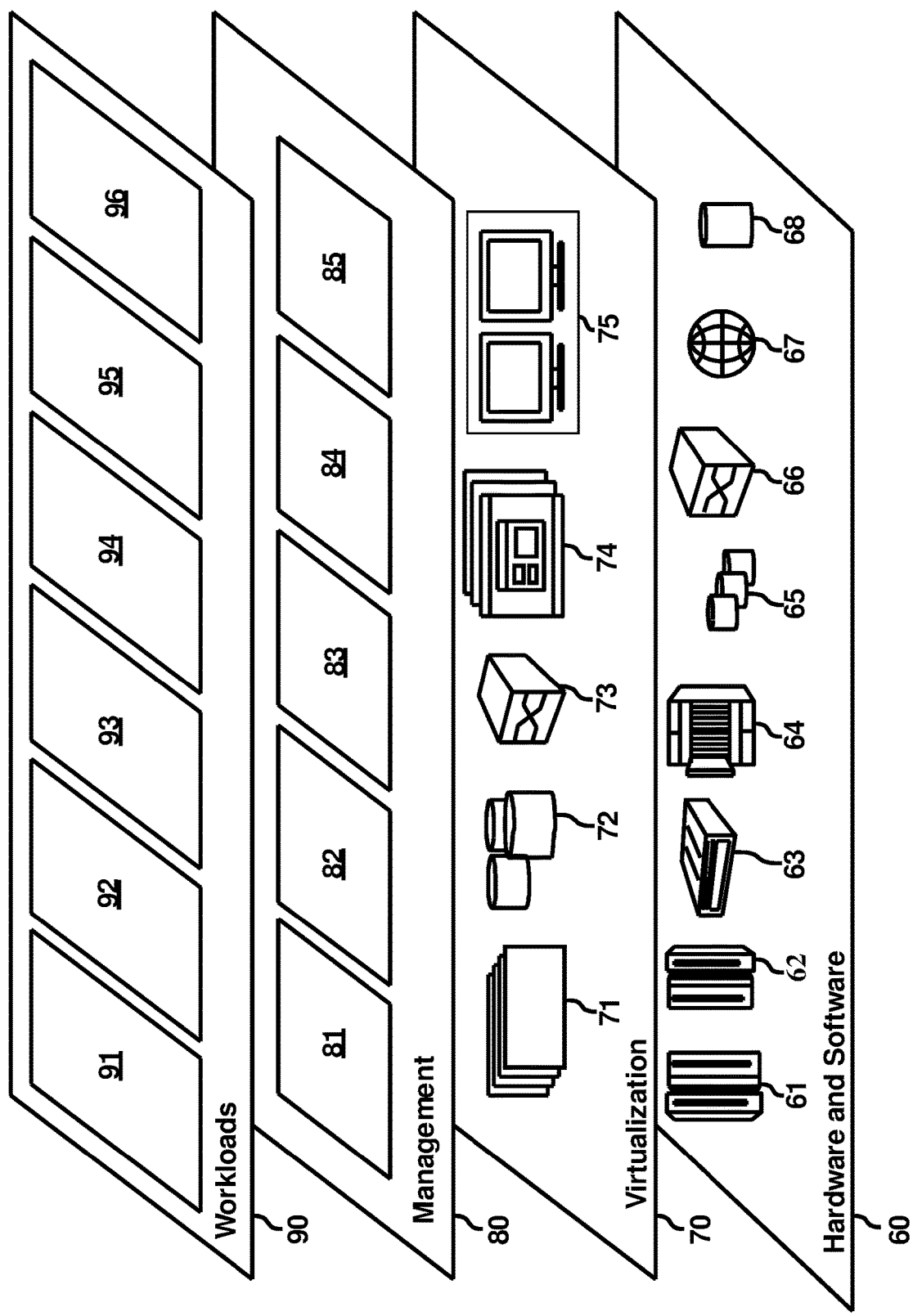
FIG. 9 depicts abstraction model layers according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
generating a plurality of tensors based on spatial attributes of a set of cybersecurity data and temporal attributes of the set of cybersecurity data, wherein the set of cybersecurity data comprises numeric data and textual data, and wherein the set of cybersecurity data is collected from a plurality of computational sources;

providing the plurality of tensors to a Hierarchical Temporal Memory (HTM) network, the HTM network configured to generate respective HTM outputs for respective regions of the HTM network, wherein respective outputs are based on active nodes for respective regions of the HTM network;

determining that at least one HTM output indicates an anomaly;

converting the at least one HTM output to a notification; and providing the notification to a user interface.

2. The method according to claim 1, wherein the set of cybersecurity data comprises syslog data, firewall event log data, operating system log data, application log data, and device log data.

3. The method according to claim 1, wherein the plurality of computational sources comprise a Security Information and Event Management (SIEM) system, a Simple Network Management Protocol (SNMP) trap, and an Intrusion Detection and Prevention System (IDPS).

4. The method according to claim 1, wherein generating a plurality of tensors further comprises:

classifying the set of cybersecurity data into a numeric data subset and a textual data subset;

generating at least a first Vector Space Model (VSM) based on the numeric data subset;

generating at least a second VSM based on the textual data subset;

storing textual associations between the first VSM and the textual data subset, wherein textual associations indicate a textual value for a respective value of a respective component of the first VSM; and storing numeric associations between the second VSM and the numeric data subset, wherein numeric associations indicate a property attribute for a respective component of the second VSM.

5. The method according to claim 4, wherein generating a plurality of tensors further comprises:

generating respective tensors based on respective VSMs; and generating at least one sparse distributed representation (SDR) based on at least one tensor.

6. The method according to claim 5, wherein providing the plurality of tensors to a Hierarchical Temporal Memory (HTM) network further comprises:

inputting at least one SDR to a first region of a first layer of the HTM network;

inputting an output of the first region of the first layer of the HTM network to a second region of a second layer of the HTM network, wherein the second layer comprises fewer nodes than the first layer; and generating a HTM output based on a set of active nodes of at least the second region of the second layer of the HTM network.

7. The method according to claim 6, wherein the notification comprises textual output and numeric output, wherein converting the HTM output to a notification further comprises:

generating textual output based, at least in part, on the HTM output and the textual associations; and generating numeric output based, at least in part, on the HTM output and the numeric associations.

8. The method according to claim 1, the method further comprising:

performing natural language processing on a query received from a user interface;

identifying a relevant portion of the HTM network based on the query;

performing natural language processing on a second output from the relevant portion of the HTM network to generate an answer to the query; and presenting the answer to the user interface.

9. The method according to claim 8, wherein the answer comprises textual data, numeric data, and a confidence value.

10. A computer-implemented method comprising:

converting, using machine learning algorithms in a feature extraction system, security data to a plurality of spatial-temporal multi-dimensional arrays, wherein the security data is collected from, at least in part, a security information and event management (SIEM) system functioning in a cybersecurity environment communicatively coupling a plurality of computational devices;

wherein the plurality of spatial-temporal multi-dimensional arrays are based, at least in part, on at least one sequence of computational events associated with at least a portion of the plurality of computational devices;

providing the plurality of spatial-temporal multi-dimensional arrays to a three-dimensional integrated circuit (3DIC) executing a Hierarchical Temporal Memory (HTM) network;

receiving, at the feature extraction system and from the HTM network, at least one output multi-dimensional array based, at least in part, on active nodes in a respective region of the HTM network;

identifying, using machine learning algorithms in the feature extraction system, at least one anomaly based on the at least one output multi-dimensional array;

reconfiguring, by the feature extraction system, at least one aspect of the cybersecurity environment in response to identifying the at least one anomaly; and presenting, by the feature extraction system and to a user interface communicatively coupled to the feature extraction system, a notification of the at least one anomaly.

11. The method according to claim 10, wherein the security data comprises syslog data, firewall event log data, operating system log data, application log data, and device log data.

12. The method according to claim 10, wherein the security data is further collected from, at least in part, a Simple Network Management Protocol (SNMP) trap and an Intrusion Detection and Prevention System (IDPS).

13. The method according to claim 10, wherein converting the security data to a plurality of spatial-temporal multi-dimensional arrays further comprises:

classifying the security data into a numeric data subset and a textual data subset;

generating a first Vector Space Model (VSM) based on the numeric data subset; and generating a second VSM based on the textual data subset.

14. The method according to claim 13, wherein converting the security data to a plurality of spatial-temporal multi-dimensional arrays further comprises:

generating respective spatial-temporal multi-dimensional arrays based on respective VSMs; and generating a sparse distributed representation (SDR) based on a spatial-temporal multi-dimensional array.

15. The method according to claim 14, wherein providing the plurality of spatial-temporal multi-dimensional arrays to a Hierarchical Temporal Memory (HTM) network further comprises:
- inputting the SDR to a first region of a first layer of the HTM network;
- inputting an output of the first region of the first layer of the HTM network to a second region of a second layer of the HTM network, wherein the second layer comprises fewer nodes than the first layer; and
- generating a HTM output based on a set of active nodes of the second region of the second layer of the HTM network.

16. The method according to claim 15, wherein converting the security data to a plurality of spatial-temporal multi-dimensional arrays further comprises:
- storing textual associations between the first VSM and the textual data subset, wherein textual associations indicate a textual value for a respective value of a respective component of the first VSM; and
- storing numeric associations between the second VSM and the numeric data subset, wherein numeric associations indicate a property attribute for a respective component of the second VSM;
- wherein the notification comprises textual output and numeric output, and wherein presenting the notification further comprises:
- generating textual output based, at least in part, on the HTM output and the textual associations; and
- generating numeric output based, at least in part, on the HTM output and the numeric associations.

17. The method according to claim 10, the method further comprising:
- performing natural language processing on a query received from the user interface;
- identifying a relevant portion of the HTM network based on the query;
- performing natural language processing on a second output from the relevant portion of the HTM network to generate an answer to the query; and
- presenting the answer to the user interface.

18. The method according to claim 17, wherein the answer comprises textual data, numeric data, and a confidence value.

19. The method according to claim 10, wherein the computer-implemented is performed according to instructions downloaded over a network from a remote data processing system.

20. A computer-implemented method comprising:
- generating a plurality of tensors based on spatial attributes and temporal attributes of a set of cybersecurity data, wherein the set of cybersecurity data comprises syslog data, firewall event log data, operating system log data, application log data, and device log data, and wherein the set of cybersecurity data is collected from a Security Information and Event Management (STEM) system, a Simple Network Management Protocol (SNMP) trap, and an Intrusion Detection and Prevention System (IDPS);
- providing the plurality of tensors to a Hierarchical Temporal Memory (HTM) network implemented on a three-dimensional integrated circuit (3DIC);
- determining that an HTM output of the HTM network indicates an anomaly in the set of cybersecurity data;
- converting the HTM output to a notification; and
- providing the notification to a user interface.

* * * * *